US009912571B2

(12) United States Patent
Dixon et al.

(10) Patent No.: US 9,912,571 B2
(45) Date of Patent: Mar. 6, 2018

(54) DETERMINING A TRANSACTION PARALLELIZATION IMPROVEMENT METRIC

(71) Applicant: International Business Machines Corporation, Armonk, NY (US)

(72) Inventors: Scot W. Dixon, Manning (AU); Ian L. Gregor, Dianella (AU); Benjamin Hartnett, West Perth (AU); Mark N. Weatherill, Victoria Park (AU)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 14/980,497

(22) Filed: Dec. 28, 2015

(65) Prior Publication Data

US 2017/0187604 A1 Jun. 29, 2017

(51) Int. Cl.

| | |
|---|---|
| ***G06F 15/16*** | (2006.01) |
| ***H04L 12/26*** | (2006.01) |
| ***H04L 29/06*** | (2006.01) |
| ***G06F 17/11*** | (2006.01) |

(52) U.S. Cl.

CPC .............. *H04L 43/16* (2013.01); *G06F 17/11* (2013.01); *H04L 67/42* (2013.01)

(58) Field of Classification Search

CPC ........... H04L 43/16; H04L 67/42; G06F 17/11
See application file for complete search history.

(56) References Cited

U.S. PATENT DOCUMENTS

| | | | | |
|---|---|---|---|---|
| 6,763,380 | B1 | 7/2004 | Mayton et al. | |
| 7,818,418 | B2 | 10/2010 | Bansal et al. | |
| 8,209,415 | B2 | 6/2012 | Wei | |
| 8,346,909 | B2 | 1/2013 | Dan et al. | |
| 8,479,204 | B1 | 7/2013 | Labonte et al. | |
| 8,966,450 | B2 | 2/2015 | Kunze et al. | |
| 9,465,649 | B2 | 10/2016 | Meng et al. | |
| 2003/0144970 | A1 | 7/2003 | Coyne | |
| 2004/0039728 | A1 | 2/2004 | Fenlon et al. | |
| 2007/0094066 | A1 * | 4/2007 | Kumar .................. | G06Q 10/04 706/61 |
| 2008/0228690 | A1 | 9/2008 | Horovitz | |
| 2009/0240742 | A1 | 9/2009 | Burghard et al. | |

(Continued)

OTHER PUBLICATIONS

IBM: List of IBM Patents or Patent Applications Treated as Related (Appendix P), Dec. 29, 2015, pp. 1-2.

(Continued)

*Primary Examiner* — Jonathan Bui
(74) *Attorney, Agent, or Firm* — Samuel A. Waldbaum

(57) ABSTRACT

A method, program product, and system for a transaction parallelization improvement metric calculation includes receiving tracking data. The tracking data includes information about inbound and outbound subtransactions between domains over a time frame. Each domain includes at least one computer. Using the tracking data received, a number of interactions are determined based on a number of the inbound and outbound subtransactions. A total number of domains is determined using received tracking data. A transaction parallelization metric is calculated using the tracking data and a transaction parallelization improvement metric is calculated based on the number of interactions, the number domains, and the transaction parallelization metric.

20 Claims, 8 Drawing Sheets

(56) References Cited

U.S. PATENT DOCUMENTS

| | | | | |
|---|---|---|---|---|
| 2011/0098973 | A1 | 4/2011 | Seidman | |
| 2013/0047169 | A1 | 2/2013 | Gagliardi et al. | |
| 2013/0198722 | A1 | 8/2013 | Adams et al. | |
| 2014/0189097 | A1 | 7/2014 | Sidi et al. | |
| 2014/0259024 | A1 | 9/2014 | Sridharan et al. | |
| 2014/0280894 | A1 | 9/2014 | Reynolds et al. | |
| 2014/0310392 | A1 | 10/2014 | Ho | |
| 2015/0199226 | A1 | 7/2015 | Wu et al. | |
| 2015/0269226 | A1 | 9/2015 | Veldhuizen | |
| 2015/0281110 | A1 | 10/2015 | Chow | |
| 2016/0078361 | A1* | 3/2016 | Brueckner | G06N 99/005<br>706/12 |

OTHER PUBLICATIONS

U.S. Appl. No. 14/980,503, filed Dec. 28, 2015, entitled: "Method and Apparatus for Determining A Transaction Parallelization Metric", pp. 1-39.

Adhianto et al., "HPCToolkit: Tools for performance analysis of optimized parallel programs", Concurrency and Computation: Practice and Experience, 2010, 00:1-7, Ver. Sep. 19, 2002 v2.02, pp. 1-16.

Concurrent Inc., "Concurrent, Inc. Delivers the First Application Performance Management Product for Big Data Applications", Feb. 4, 2014, pp. 1-3, http://www.concurrentinc.com/2014/02/concurrent-inc-delivers-the-first-application-performance-management-product-for-big-data-applications/.

Manageengine, "Application Performance Management Tools for Enterprise Applications", Whitepaper, printed on May 22, 2015, pp. 1-12, https://www.manageengine.com/products/applications_manager/application-performance-management-tools.html.

Tallent et al., "Effective Performance Measurement and Analysis of Multithreaded Applications," PPoPP '09, Proceedings of the 14th ACM SIGPLAN Symposium on Principles and Practice of Parallel Programming, Feb. 14-18, 2009, pp. 1-11.

Mell et al., "The NIST Definition of Cloud Computing," National Institute of Standards and Technology, U.S. Department of Commerce, Special Publication 800-145, Sep. 2011, pp. 1-7.

* cited by examiner

100
APPLICATION SERVER
TRACKING APPLICATION
150
152
USER COMPUTING DEVICE
GRAPHICAL USER INTERFACE
160
162
NETWORK
120
FIRST SERVER
APPLICATION
TRACKING MODULE
130
135
137
SECOND SERVER
APPLICATION
TRACKING MODULE
140
145
147
THIRD SERVER
APPLICATION
TRACKING MODULE
170
175
177
FOURTH SERVER
APPLICATION
TRACKING MODULE
180
185
187

DETERMINING A TRANSACTION PARALLELIZATION IMPROVEMENT METRIC

BACKGROUND

The present disclosure relates generally to computer performance, and more particularly to calculating a transaction parallelization metric using principles of statistics.

Application performance management is focused on monitoring applications and the application environments to determine the application's health and efficiency. Application performance management applications are able to monitor and predict application performance and/or monitor and determine application problems either in the application or in the environment in which the application runs. Application performance management collects several types of metrics from the application, for example, Central Processing Unit usage, transaction rates, response times, thread pool usage, or other useful data. A central processing unit (CPU) is the electronic circuitry within a computer that carries out the instructions of a computer program by performing the basic arithmetic, logical, control and input/output (I/O) operations specified by the instructions.

In a complex multi-threaded environment, where a transaction is distributed across multiple domains, typically the transaction interactions are also multiplexed across the communication protocols. The ideal environment for best application performance and resource utilization is when all threads are active (dispatched) and all communication paths are fully utilized. In this scenario no tasks are waiting for the CPU or for communication channels to be available. The above described situation can be considered to be optimum for parallelization.

BRIEF SUMMARY

Additional aspects and/or advantages will be set forth in part in the description which follows and, in part, will be apparent from the description, or may be learned by practice of the disclosure. Embodiments of the present disclosure disclose a method, computer program product, and system for determining a transaction parallelization improvement metric.

In an embodiment a method for determining a transaction parallelization improvement metric in provided. The method includes receiving tracking data that tracks how at least one domain processes a transactions over a time frame, the tracking data comprises information about inbound and outbound subtransactions between domains, each domain includes at least one computer. Transaction comprises one or more subtransactions. The method also includes determining a number of interactions using the tracking data and based on a number of the inbound and outbound subtransactions between a sender domain and a receiver domain. The method includes determining a number of domains using the tracking data. The method includes calculating a transaction parallelization metric using the tracking data. The method includes calculating a transaction parallelization improvement metric based on the number of interactions, the number of domains, and the parallelization metric, where a larger number of domains yields a lower calculated result for the transaction parallelization improvement metric.

In another computer program product for determining a transaction parallelization improvement metric the computer program product is presented. The computer program product comprises one or more non-transitory computer-readable storage media and program instructions stored on the one or more non-transitory computer-readable storage media, The computer program product includes receiving tracking data that tracks how at least one domain processes a transactions over a time frame, the tracking data comprises information about inbound and outbound subtransactions between domains, each domain includes at least one computer. Transaction comprises one or more subtransactions. The computer program product also includes determining a number of interactions using the tracking data and based on a number of the inbound and outbound subtransactions between a sender domain and a receiver domain. The computer program product includes determining a number of domains using the tracking data. The computer program product includes calculating a transaction parallelization metric using the tracking data. The computer program product includes calculating a transaction parallelization improvement metric based on the number of interactions, the number of domains, and the parallelization metric, where a larger number of domains yields a lower calculated result for the transaction parallelization improvement metric.

In an embodiment a computer system for determining a transaction parallelization improvement metrics presented. The computer system comprises one or more computer processors, one or more computer-readable storage media, and program instructions stored on one or more of the computer-readable storage media for execution by at least one of the one or more processors. The computer system includes receiving tracking data that tracks how at least one domain processes a transactions over a time frame, the tracking data comprises information about inbound and outbound subtransactions between domains, each domain includes at least one computer. Transaction comprises one or more subtransactions. The computer system also includes determining a number of interactions using the tracking data and based on a number of the inbound and outbound subtransactions between a sender domain and a receiver domain. The computer system includes determining a number of domains using the tracking data. The computer system includes calculating a transaction parallelization metric using the tracking data. The computer system includes calculating a transaction parallelization improvement metric based on the number of interactions, the number of domains, and the parallelization metric, where a larger number of domains yields a lower calculated result for the transaction parallelization improvement metric.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

DETAILED DESCRIPTION

Figure 1:
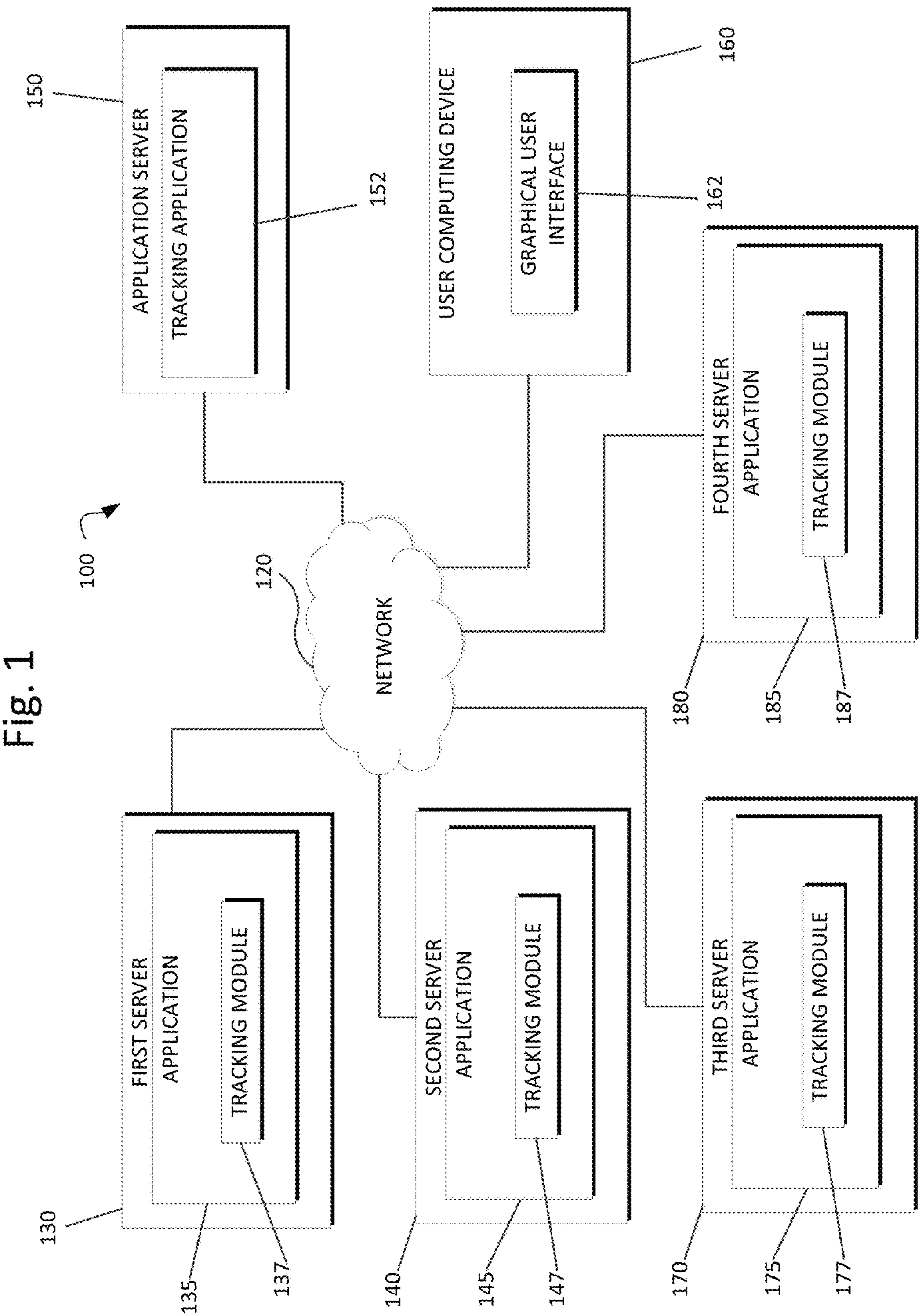
FIG. 1 is a schematic block diagram depicting an exemplary computing environment for determining a transaction parallelization metric and transaction parallelization improvement metric, in accordance with an embodiment of the present disclosure.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to the embodiments of the present disclosure, examples of which are illustrated in the accompanying drawings, wherein like reference numerals refer to like elements throughout. Embodiments of the disclosure are general directed to a system for determining a transaction parallelization metric. In one embodiment, a first server, a second server, a third server, and a fourth server each host an application that communicates with the others via transactions over a network. The server or the application includes a tracking module that tracks the communications, via a network, between the applications. The tracking data is analyzed to determine a level of transactional parallelization, and a parallelization metric is provided to a user.

FIG. 1 depicts a computer environment 100 for determining a transaction parallelization metric and transaction parallelization improvement metric, in accordance with an embodiment of the present disclosure. In various embodiments of the present disclosure, the computer environment 100 includes a first server 130, a second server 140, a third server 170, a fourth server 180, an application server 150, and a user computing device 160 that communicate with each other, via network 120. While the parallelization metric proposes a method of determining a value that represents the idea of how 'far' from an perfect state the currently running application is, the transaction parallelization improvement metric allows a user to determine how difficult it might be to improve the parallelization and parallelization metric for a monitored transaction by applying the number of interactions and the variety of interactions to the parallelization metric. The assumption is that interaction count and variety indicates potential improvement. In an embodiment, transaction parallelization improvement metric may be displayed to a user in order for the user to gage the difficulty of improving the parallelization.

It must be appreciated that the present disclosure provides a method, computer system, and a computer program product which generates and displays a transaction parallelization metric and/or transaction parallelization improvement metric. By providing the above-mentioned metrics to a user, present disclosure provides a method, computer system and program product which produces tangible feedback to a user which highlights how efficient a software application is, and/or how a software application could be improved. The feedback may be provided to the user in the form of a report. The report may also be used to gage the efficiencies of a computer system as a whole. In an embodiment, a user may alter different aspects of a transaction or application (e.g. number of subtransactions, number of domains . . . ) and, as a result, modify the transaction parallelization metric and transaction parallelization improvement metric in order to achieve customized or improved efficiency.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between the first server 130, the second server 140, third server 170, a fourth server 180, an application server 150, and the user computing device 160, in accordance with one or more embodiments of the disclosure.

Figure 5:
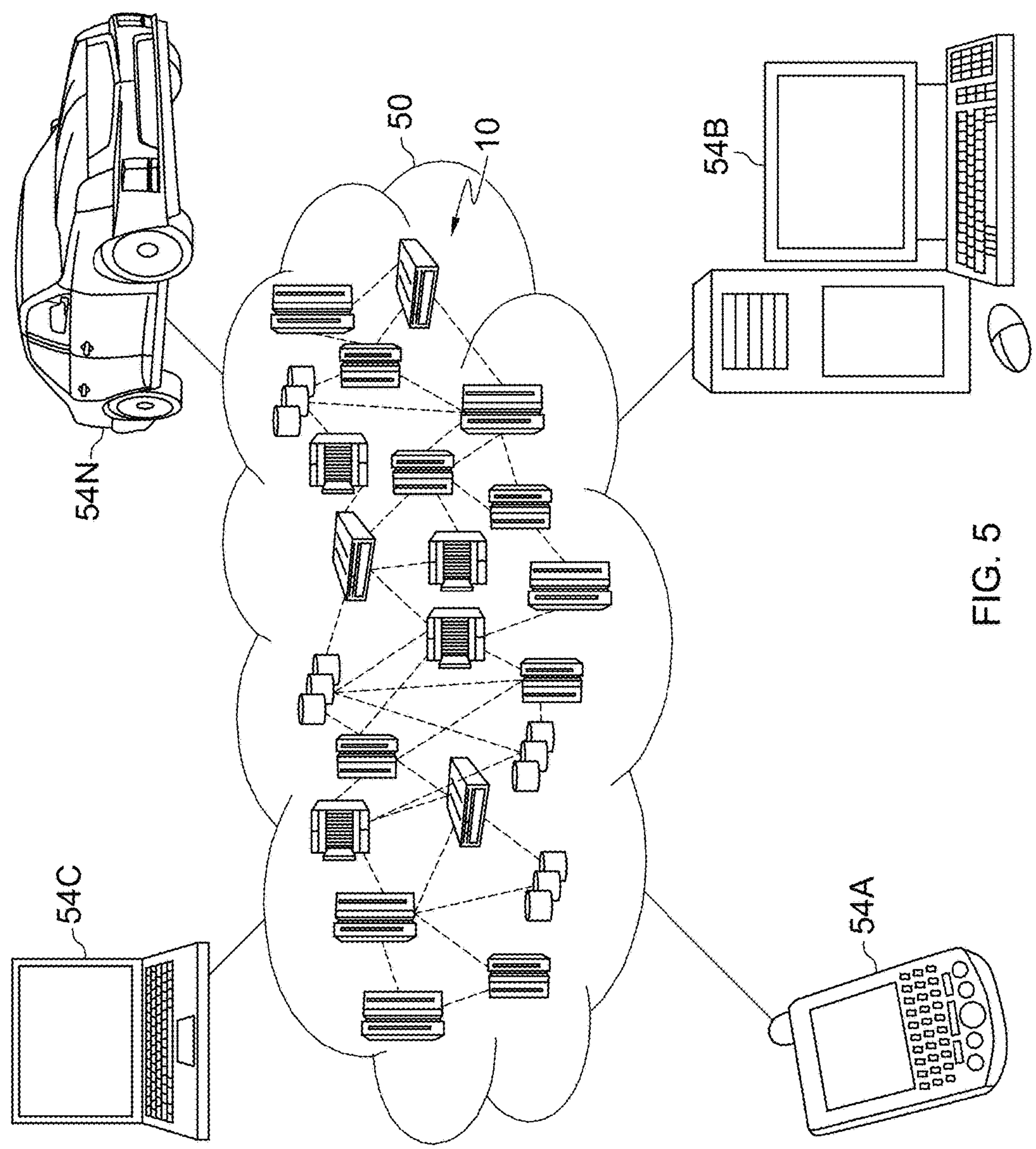
FIG. 5 depicts a cloud computing environment according to an embodiment of the present disclosure.
Figure 6:
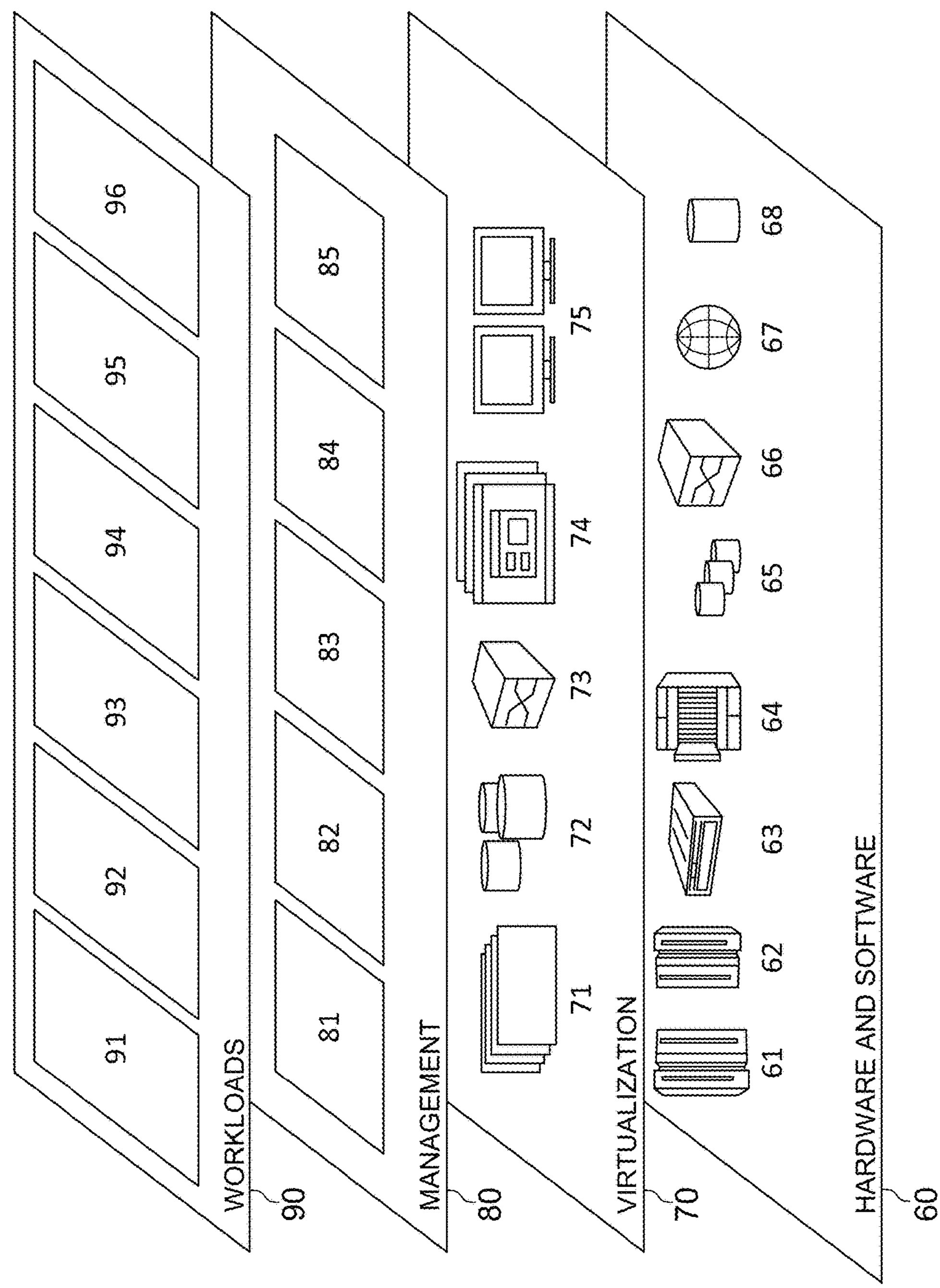
FIG. 6 depicts abstraction model layers according to an embodiment of the present disclosure.

The first server 130, the second server 140, the third server 170, and the fourth server 180 can be located at different locations or within the same server farm. Furthermore, the first server 130, the second server 140, the third server 170, and the fourth server 180 can be the same server and be considered different applications running simultaneously that require communication between the applications. The first sever 130, the second server 140, the third server 170, and the fourth server 180 may be any type of computing devices that are capable of connecting to network 120, for example, a laptop computer, tablet computer, netbook computer, personal computer (PC), a desktop computer, a smart phone, or any programmable electronic device supporting the functionality required by one or more embodiments of the disclosure. The first sever 130, the second server 140, the third server 170, and the fourth server 180 may include internal and external hardware components, as depicted and described in further detail below with respect to FIG. 4. In other embodiments, the first sever 130, the second server 140, the third server 170, and the fourth server 180 may operate in a cloud computing environment, as depicted in FIGS. 5 and 6.

The first server 130, the second server 140, the third server 170, and the fourth server 180 each include an application 135, 145, 175 and 185, respectively. Applications 145, 175, and 185 each communicate with application 135, via network 120, via transactions executing in applications 135, 145, 175 and 185. Applications 135, 145, 175, and 185 includes a tracking module 137, 147, 177, and 187 respectively, to track the transactional communications between the applications 135, 145, 175, and 185. The tracking modules 137, 147, 177, and 187 may be part of their respective applications 135, 145, 175, and 185, or the tracking module 137, 147, 177, and 187 may be part of a separate application or part of each server 130, 140, 170, and 180, respectively.

The tracking modules 137, 147, 177, and 187 tracks transactions that occur between applications 135, 145, 175, and 185. However, the tracking modules 137, 147, 177, and 187 are able to track any type of communications that might occur between applications 135, 145, 175, and 185. For example, the tracking modules 137, 147, 177, and 187 track the time at which they receive a transaction or send a completed transaction. The tracking modules 137, 147, 177, and 187 transmit the tracking data to a tracking application 152 on application server 150.

Application server 150 hosts the tracking application 152 that receives the tracking data from the tracking modules 137, 147, 177, and 187. The tracking application 152 analyzes the tracking data to determine an average parallelization metric for a plurality of transactions and/or a parallelization metric for one transaction and can analyze any other tracking data that might be relevant. The tracking application 152 transmits the analyzed tracking data to a user computing device 160 to make the information accessible to a user. The user computing device 160 can be a separate computing device or can be part of application server 150. The application server 150 may include internal and external hardware components, as depicted and described in further detail below with respect to FIG. 4. In other embodiments, the application server 150 may operate in a cloud computing environment, as depicted in FIGS. 5 and 6.

The user computing device 160 represents a computing device that includes a user interface, for example, a graphical user interface (GUI) 162 that displays the received tracking data from the tracking application 152. GUI 162 represents one or more user interfaces for sending and receiving information from the application server 150 and the tracking application 152. GUI 162 may be, for example, a web browser, an application, or other types of GUIs for communication between the user computing device 160, application server 150 and the tracking application 152, via the network 120.

The user computing device 160 may be any type of computing devices that are capable of connecting to network 120, for example, a laptop computer, tablet computer, netbook computer, personal computer (PC), a desktop computer, a smart phone, or any programmable electronic device supporting the functionality required by one or more embodiments of the disclosure. The user computing device 160 may include internal and external hardware components, as depicted and described in further detail below with respect to FIG. 4. In other embodiments, the user computing device 160 may operate in a cloud computing environment, as depicted in FIGS. 5 and 6.

The tracking application 152 receives the tracking data from tracking modules 137, 147, 177, and 187. The tracking data contains data about a plurality of transactions processed by applications 135, 145, 175, and 185, where each of the plurality of transactions is composed of a plurality of subtransactions. The tracking application 152 calculates a parallelization metric for each of the plurality of transactions, which will be described in further detail below, and is able to calculate an average for the parallelization metric for the plurality of transactions.

The tracking application 152 will calculate the parallelization metric for each of the transaction of the plurality of transactions. The tracking application 152 calculates the parallelization metric for each transaction, based on, a longest response time for one subtransaction out of plurality of subtransaction that make up a single transaction, the sum of the response times for all of the subtransactions that make up the single transaction from the received tracking data, and the actual execution time for the transaction.

In embodiments of the disclosure, each transaction that application 135 of the first server 130 executes is composed of a plurality of subtransactions. In an exemplary embodiment, a transaction that application 135 of the first server 130 executes is composed of a plurality of subtransactions that are sent to one of the second server 140, the third server 170, and the fourth server 180. The longest response time for one subtransaction is equal to the response time, as measured from the time a subtransaction is transmitted by the first server 130 to an application on another application server, to the time the results of the subtransaction are received by the first server 130, for the longest single substransaction of the plurality of substransactions to complete the transaction. The sum of the response times is equal to the sum of all the response times for all of the substransactions of the plurality of substransactions to complete the transaction. FIG. 3 is a message flow diagram depicting exemplary communications between four servers that can be used to show how the different response times are determined.

FIG. 3 is an exemplary message flow diagram of the transactional communications between the first server 130, the second server 140, the third server 170, and the fourth server 180 but the message flow diagram can also be considered show the exemplary communications between applications 135, 145, 175, and 185. At time TO the first server 130 starts the transaction process that is composed of five subtransactions. The first server 130 sends the first subtransaction, (i.e. the subtransaction has been completely sent) to the second server 140 at time T1. At time T2 the first server 130 finishes receiving the processed first subtransaction from the second server 140. Therefore, the time required to process the first subtransaction is the difference between times T2 and T1. At time T3 the first server 130 sends the second subtransaction to the third server 170 and at time T4 the first server finishes receiving the processed second subtransaction from the third server 170. The number of subtransactions that need to be processed between the first sever 130, the second server 140, the third server 170, and the fourth server 180 may vary in different instances. A time delay for when the second subtransaction is sent by the first server 130 is the difference between time T3 when the second transaction is sent and time T2 when the first server 130 received the processed first transaction.

Similarly, the time required to process the third subtransaction is the difference between times T6 and T5, the time required [4th and 5th subtransactions].

The first server 130 transmits the five subtransactions to the second server 140, the third server 170 and the fourth server 180, respectively, so that the subtransactions would be processed at the same time, i.e. the ideal conditions. The longest response time is equal to the response time for a single substransaction that requires the most amount of time out of the response times out each of the plurality of substransactions to complete the transaction.

When the first server 130 sends out one subtransaction at a time to be processed and the first server 130 does not sends the next subtransaction until it receives the previous subtransaction that has been processed, thus servers 130, 140, 170, and 180 would be processing the transaction in series, i.e. the worst case conditions.

Referring back to FIG. 1, the tracking application 152 receives the tracking data from the tracking modules 137, 147, 177, 187 to calculate the longest response time for one subtransaction out of the plurality of subtransactions that make up the single transaction and sum of the response times for all of the subtransactions that form the single transaction, the actual execution time to complete the transaction, and the parallelization metric, described in more detail below, from the received tracking data. Table 1 is an example of tracking data that the tracking application 152 may receive from the tracking modules 137, 147, 177, and 187.

TABLE 1

| EVENT (or data record number) | SOURCE PROGRAM | TYPE OF CALL | TARGET PROGRAM | TIME STAMP |
|---|---|---|---|---|
| 1 | 1$^{st}$ Application | STARTS | | 10:00:00 |
| 2 | 1$^{st}$ Application | CALLS | 2$^{nd}$ Application | 10:00:05 |
| 3 | 2$^{nd}$ Application | RETURNS TO | 1$^{st}$ Application | 10:00:10 |
| 4 | 1$^{st}$ Application | CALLS | 3$^{rd}$ Application | 10:00:15 |
| 5 | 3$^{rd}$ Application | RETURNS TO | 1$^{st}$ Application | 10:00:20 |
| 6 | 1$^{st}$ Application | CALLS | 4$^{th}$ Application | 10:00:40 |
| 7 | 4$^{th}$ Application | RETURNS TO | 1$^{st}$ Application | 10:00:50 |
| 8 | 1$^{st}$ Application | STOPS | | 10:01:00 |

With respect to Table 1, the number of the application represents the applications 135, 145, 175, and 185 of each the servers 130, 140, 170, and 180, respectively. The tracking application 152 calculates the actual execution time by determining the amount of time to that is used to perform the necessary operations. For example, as illustrated by the example shown in Table 1, the actual execution time is the total time of the transaction from the application 135 of the first server 130 (using records 1 and 8) from STARTS to STOPS, which, in this example, is 10:01:00 minus 10:00:00, or 1 minute.

The tracking application calculates the response time for each of subtractions from each of the applications 145, 175, 185 took to send back the subtransaction that they each processed, respectively, (application 145=10:00:10 minus 10:00:05 or 5 seconds, application 175=10:00:20 minus 10:00:15 or 5 seconds, application 185=10:00:50 minus 10:00:40 or 10 seconds). The greatest of these is application 185 which is 10 seconds, thus this number represents the longest response time for one subtransaction out of plurality of subtransaction that comprise a single transaction.

The sum of time for applications 145, 175, and 185 is 5+5+10, which equals 20 seconds. This number is the time it would take to run the three subtransactions calls if they were called one after another, thus this number represents the sum of the response times for all of the subtransactions that form the single transaction.

The tracking application 152 calculates the parallelization metric using the following equation:

$$C=((A-L)/(A-S))*100\% \quad (1)$$

wherein S is the longest response time for one subtransaction out of plurality of subtransaction that comprise a single transaction, L is the sum of the response times for all of the subtransactions that form the single transaction, A is the actual execution time of the transaction, and C is the parallelization metric. For example, based on the tracking data in Table 1, the parallelization metric is calculated to be C=80%.

Larger calculated parallelization metrics indicate that the transactions are executing at a higher level of parallelization. The best case scenario is when the calculated parallelization metric is 100 and the worst case scenario is when the parallelization metric is 0. The above example illustrates how the parallelization metric is calculated for a singular transaction, but the tracking application 152 calculates the parallelization metric for a plurality of transaction and determines the parallelization metric average. The parallelization metric average illustrates how well the applications 135, 145, 175, and 185 of each the servers 130, 140, 170, and 180, respectively, are operating in a parallel fashion with respect to execution of the tracked transactions.

The GUI 162 displays the average parallelization metric to a user to illustrate the processing environment for the plurality of transactions. The GUI 162 may display the average parallelization metric in different colors to reflect how well the transactions are executing in parallel. For example, if the average parallelization metric falls within the range of 0 to 50, the GUI 162 may display the average parallelization metric in red to indicate that applications may lack subtasking or multi-threading implementation since the average parallelization metric is low and there are opportunities for improvement with regard to transactional parallelization. For example, if the average parallelization metric falls within the range of 51 to 75, the GUI 162 will display the average parallelization metric in yellow to indicate that the applications are communicating somewhat in parallel, but there might be a subtasking or threading problem. For example, if the average parallelization metric falls within the range of 76 to 100, the GUI 162 will display the average parallelization metric in green to indicate that the applications are communicating in parallel without any issues.

Figure 2A:
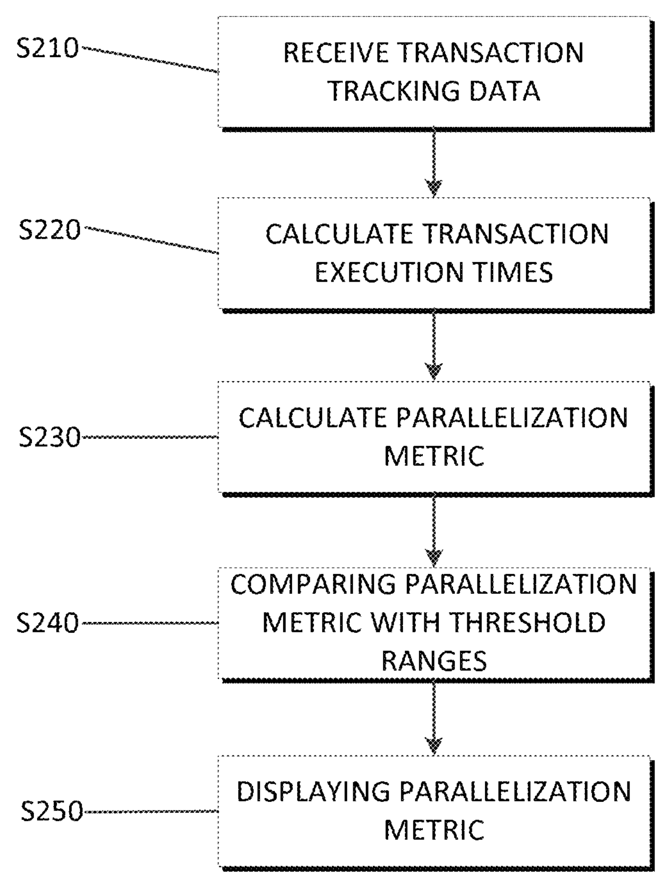
FIG. 2A is a flowchart depicting operational steps of determining transaction parallelization metric, in accordance with an embodiment of the present disclosure.

FIG. 2A is a flowchart depicting operational steps of determining transaction parallelization metric, in accordance with an embodiment of the present disclosure.

Figure 2B:
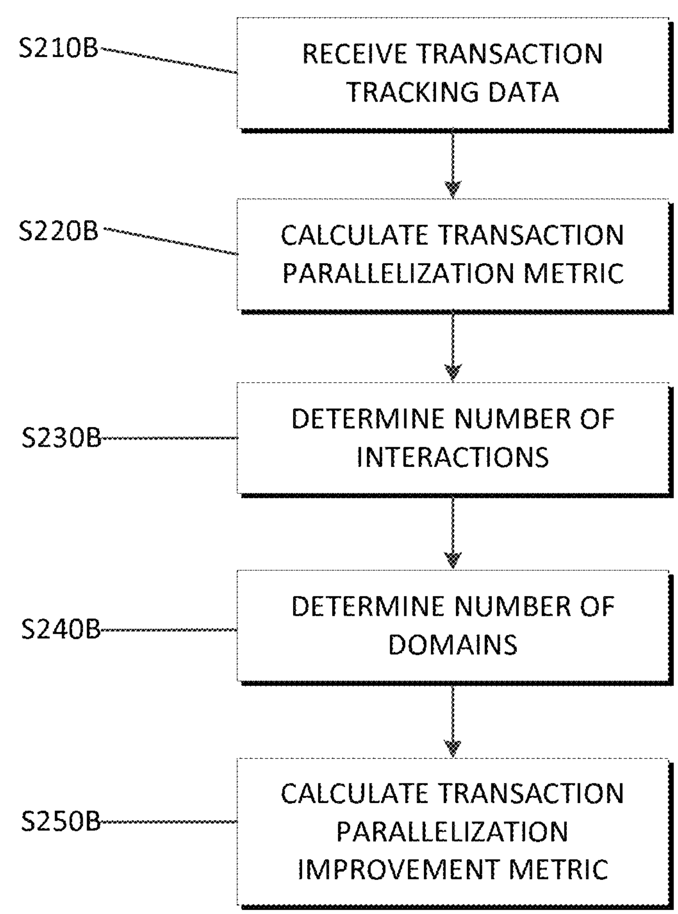
FIG. 2B is a flowchart depicting operational steps of determining transaction parallelization improvement metric, in accordance with an embodiment of the present disclosure.

Referring now to FIG. 2B, a method 200 depicts operational steps of determining transaction parallelization improvement metric, in accordance with an embodiment of the present disclosure.

At block S210B, the tracking application 152 may receive tracking data from the tracking modules 137, 147, 177, and 187. Tracking modules 137, 147, 177, and 187 may, in addition to the above mentioned data, track the number of domains, and number of over all transactions and subtransactions.

At block S220B, tracking application 152 may, as provided in detail above and illustrated in FIG. 2A, calculate transaction parallelization metric based on the received information.

At block S230B, tracking application 152 may determine a total number of interactions based on the received tracking data. An interaction may be defined as a pair of subtransactions going inbound and outbound from a domain. For example in FIG. 3A, first server 130 and second server 140 communicate via the first subtransactions and the processed first subtransactions. In an embodiment, the first subtransactions and the processed first subtransactions may be counted as an interaction. In another embodiment, the number of interactions may be calculated by dividing the total number of subtransactions and processed subtransactions by two and if the total is an odd number (occurring in cases in which the server communicates some output into another server) the number may be rounded up or down in order to calculate the total number of interactions.

At block S240B, tracking application 152 may determine a total number of domains. The number of domains is simply the total number of domains used within the transaction. A domain may be any entity which transacts with another including but not limited to server, cloud server, application which may transact with other domains.

Figure 3A:
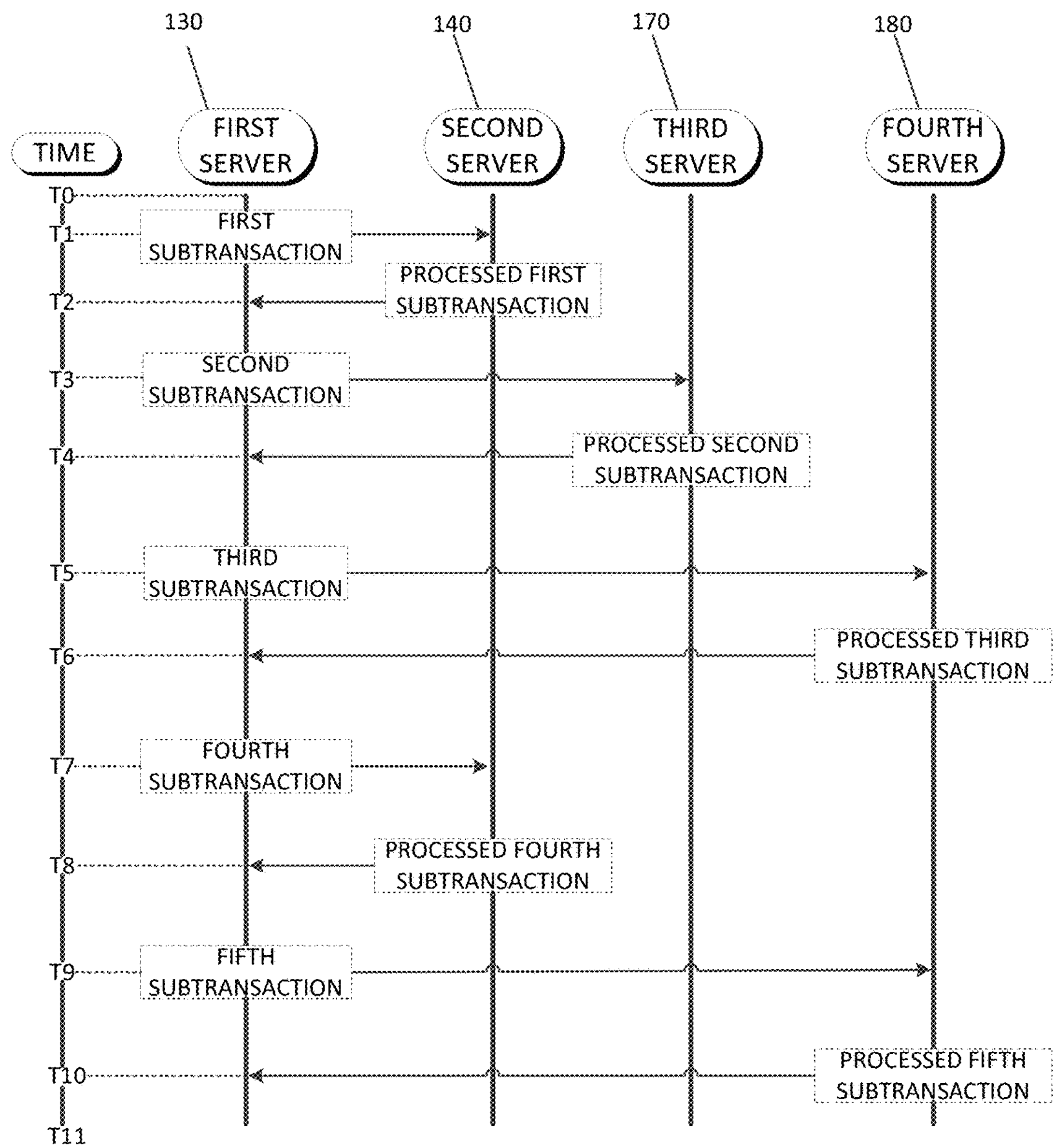
FIG. 3A is a message flow diagram depicting exemplary communications between four servers.

In the present embodiment, tracking application 152 receives tracking data from the tracking modules 137, 147, 177, and 187. The tracking data includes a total number of domains (which in the embodiment depicted in FIG. 3A are servers) as 4 (i.e. first server 130, second server 140, third server 170, and fourth server 180). Transaction data also indicates five total interactions by counting every subtransaction and processed subtransaction as one interaction. In this embodiment, for example, first subtrasaction and the processed first subtrasaction are counted as one interaction between first server 130 and second server 140).

At S250B, tracking application 152 may calculate a transaction parallelization improvement metric using information received from tracking modules 137, 147, 177, and 187. More specifically, tracking application 152 may use the transaction parallelization metric (calculation shown above), total number of domains, and total number of transactions. In an embodiment tracking application 152 may use the following formula to calculate the transaction parallelization improvement metric:

$$D=C+(1-C)((i-v)/i)(1-\exp(-i/k))$$

wherein D represents the transaction parallelization improvement metric, C represents the above mentioned parallelization metric, i represents the number of interactions, v represents the total number of domains, and k represents a graphical constant. A graphical constant may represent an arbitrary constant which controls the scale of graphical representation of the transaction parallelization improvement metric graph. In an embodiment, a user may be able to change the k value in order to customize the graphical representation of the transaction parallelization improvement metric.

It must be appreciated that when a transaction parallelization metric is low, the rest of the formula (i.e. the number of interactions and domains) will have more effect on the transaction parallelization improvement metric, and when transaction parallelization metric is high, it will have more effect on the overall formula. In other words, transaction parallelization metric of 100% or 1 will yield a 100% transaction parallelization improvement metric because $1+(1-1)*((i-v)/i)(1-\exp(-i/k))=1+0*((i-v)/i)(1-\exp(-i/k))=1$. Also when the transaction parallelization metric is at 0% or 0 will cancel out the effect of transaction parallelization metric out of formula because $(1-C)$ will yield a 0. In that example the transaction parallelization improvement will be calculated based on: $((i-v)/i)(1-\exp(-i/k))$. This is consistent with the logic that when a system is at 100% efficiency, it is more difficult to improve than a system with a 0% efficiency.

It must also be appreciated that the transaction parallelization improvement metric may decrease given a larger number of domains. For example given the same D value, let v=1, i=10 and the equation will be: $C+(1-C)(1+10-1)/10=C+(1-C)10/10=C+(1-C)$. This will yield a higher number than if v=10, i=10. Because when v=10 the equation will yield the following: $C+(1-C)(1+10-10)/10=C+(1-C)(1/10)$. It is clear that $C+(1-C)$ is a larger number than $C+(1-C)(1/10)$ and as mentioned above a larger number of transaction parallelization improvement metric means that it is harder to improve parallelization. Therefore it logically follows that all else being the same value, a larger number of domains will make is easier for improvement of the parallelization.

Figure 3B:
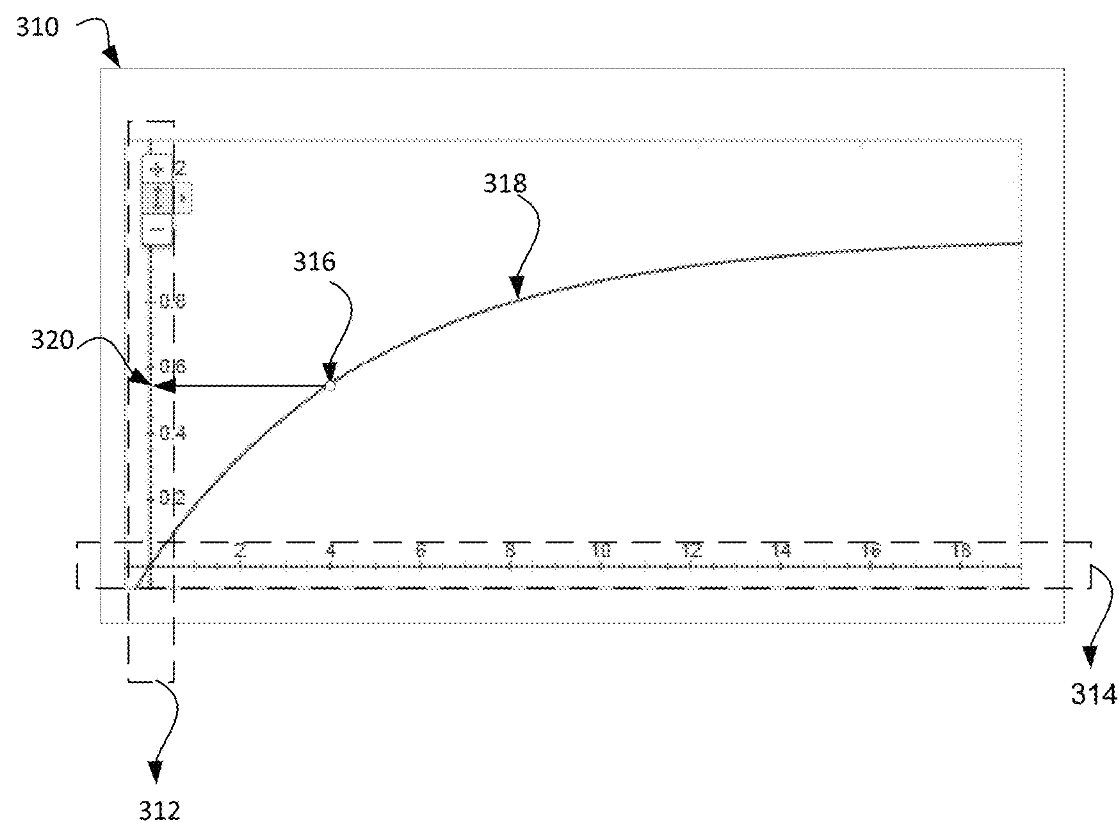
FIG. 3B is a graphical representation depicting a graphical user interface communicating with a user, in accordance with an embodiment of the present disclosure.

The above mentioned formula may also contain an exponential component to demonstrate that as parallelism increases, the difficulty in increasing the parallelism increases as well. However, the rate at which the difficulty increases will differ from application to application. The rate can be dampened by modifying the k value in $(1-\exp(-i/k))$. Given k=1 in $(1-\exp(-i/k))$, for i=0, 1, 2, 3, 4 would yield approximately 0%, 60%, 85%, 95%, 98%. Increasing k will decrease the rate of increase of the output for i, e.g., given k=10, for i=0, 1, 2, 3, 4 would yield approximately 0%, 18%, 33%, 45%, 55%. Lower values of k may show that lower values of i are widely separated and high i values are grouped, higher values of k show that higher values of i are not so packed together. For example, and as illustrated in FIG. 3B, graph 310 uses a K value of 5. Graph 310 represents the values for the following function:

$$Y=1-\exp((-X/5)$$

The above mentioned function is a part of the overall equation used to calculate the transaction parallelization improvement metric. For the purpose of clarity, the rest of the formula is not shown.

In this embodiment, graph 310, X axis (represented by range 314) ranges from 0-20; which also represents i (number of interactions) and Y-axis represents the part of the function as shown above and ranges from 0-1 (range 312). Line 318 is a graphical representation of the above mentioned function therefore using corresponding X and Y values within the graph, one may determine the i, X, and Y at any point within line 318. For example, point 316 has a corresponding X value of 4 (which in this function i and X are used interchangeably) therefore the Y value may be calculated by $Y=1-e^{\wedge}(-4/5)=0.55$ which is the same as value 320. It must also be appreciated that in an embodiment, a higher value of K may yield a wider range in the graphical representation. In an embodiment, K value may be used by a user in order to zoom in and out of a graphical representation of the transaction parallelization improvement metric.

In the present embodiment, the total number of domains is 5 (v=5), the total number of interactions is 5(i=5), and the parallelization metric is 80% or 0.8 (as explained above). Therefore the transaction parallelization improvement metric will be calculated by:

$$D=0.8+(1-0.8)*((5-5)/5)(1-e^{\wedge}(-5/k)=0.8 \text{ or } 80\%$$

In the present embodiment, the value of k does not make any difference within the formula or the eventual calculation of the transaction parallelization improvement metric. This is due to the fact that i=v=5 and therefore the second half of the formula is multiplied with 0 which would ultimately yield 0. Therefore in the present embodiment, parallelization metric and transaction parallelization improvement metric are the same value.

In an embodiment GUI 162 may display the transaction parallelization improvement metric to a user in order to illustrate how difficult or easy it is to improve the efficiency. The GUI 162 may display the transaction parallelization improvement metric in different colors after comparing them to a pre-defined threshold in order to reflect how well the transactions are able to improve. For example, if the transaction parallelization improvement metric falls within range 0 to 50, the GUI 154 may display the transaction parallelization improvement metric in green to indicate that applications easy to improve and if the transaction parallelization improvement metric falls within range 51 to 75, the GUI 162 may display the transaction parallelization improvement metric in yellow in order to indicate that the applications are somewhat difficult to improve and if the transaction parallelization improvement metric falls within range 76 to 100, the GUI 162 will display the parallelization metric in red to indicate that the applications are very hard to improve. In other embodiments, GUI 162 may rank several transactions in order to show which systems or transactions may be improved the easiest.

In another embodiment, tracking application 152 may compare the parallelization improvement values to a predefined threshold. In that embodiment, if the transaction parallelization improvement metric is lower than the threshold, tracking application 152 may notify the user.

In a further embodiment, tracking application 152 may recommend possible outcomes by changing one or more values within the equation in order to show a user other possible outcomes. For example and in the present embodiment, tracking application may calculate the improvement metric with a higher number of i value and present the user with the result. The user may, using those result make a determination on how to proceed.

In another embodiment, tracking application 152 may calculate an historical baseline (in one embodiment the average of historical values for improvement metric) to derive an expected value for the transaction parallelization improvement metric. If the transaction parallelization improvement metric differs significantly from this historical average/expected value, tracking application 152 may notify or alert the user. Furthermore the historical baseline maybe determined using information kept in a data bank which may include different transaction parallelization improvement metric value for a time frame or different transactions.

The tracking application 152 receives tracking data from the tracking modules 137, 147, 177, and 187 (S210). The tracking application 152 calculates the shortest possible execution time, the largest possible execution time, and the actual execution time from the received tracking data (S220). The tracking application 152 calculates the parallelization metric for each of a plurality of transactions and calculates an average parallelization metric (S230) and compares the average parallelization metric to the threshold ranges (S240). The GUI 162 displays the calculated average parallelization metric based on the comparison (S250).

Figure 4:
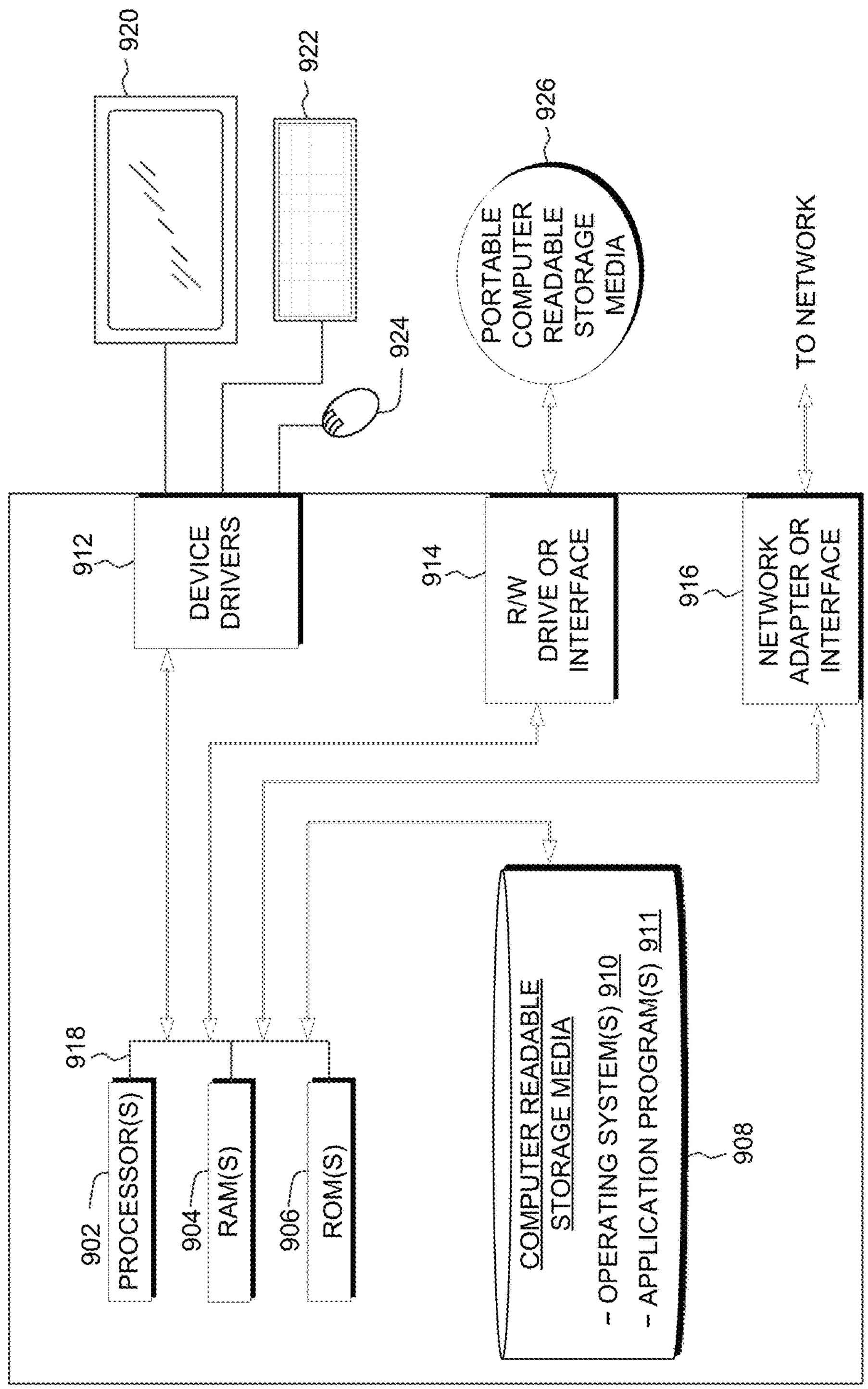
FIG. 4 is a block diagram of components of a computing device of the secure communication systems of FIG. 1, in accordance with embodiments of the present disclosure.

FIG. 4 depicts a block diagram of components of user computing device 160 of the environment 100 of FIG. 1, in accordance with an embodiment of the present disclosure. It should be appreciated that FIG. 4 provides only an illustration of one implementation and does not imply any limitations with regard to the environments in which different embodiments may be implemented. Many modifications to the depicted environment may be made.

User computing devices 160 and/or servers 130, 140, and application server 150 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, tracking application 152 (FIG. 1), are stored on one or more of the computer readable storage media 908 for execution by one or more of the processors 902 via one or more of the respective computer readable RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing devices 160 and/or servers 130, 140, and application server 150 may also include a R/W drive or interface 914 to read from and write to one or more portable computer readable storage media 926. Application programs 911 on the user computing devices 160 and/or servers 130, 140, and application server 150 may be stored on one or more of the portable computer readable storage media 926, read via the respective R/W drive or interface 914 and loaded into the respective computer readable storage media 908.

User computing devices 160 and/or servers 130, 140, and application server 150 may also include a network adapter or interface 916, such as a TCP/IP adapter card or wireless communication adapter (such as a 4G wireless communication adapter using OFDMA technology). Application programs 911 on the user computing devices 160 and/or servers 130 and 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing devices 160 and/or servers 130, 140, and application server 150 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or computer readable ROM 906).

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, cloud computing environment 50 is depicted. As shown, cloud computing environment 50 comprises one or more cloud computing node 10 with which local computing devices used by cloud consumers, such as, for example, personal digital assistant (PDA) or cellular telephone 54A, desktop computer 54B, laptop computer 54C, and/or automobile computer system 54N may communicate. Cloud computing node 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of cellular telephone 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system for determining the transacting parallelization improvement metric 96.

Based on the foregoing, a computer system, method, and computer program product have been disclosed. However, numerous modifications and substitutions can be made without deviating from the scope of the present disclosure. Therefore, the present disclosure has been disclosed by way of example and not limitation.

While the disclosure has been shown and described with reference to certain exemplary embodiments thereof, it will be understood by those skilled in the art that various changes in form and details may be made therein without departing from the spirit and scope of the present disclosure as defined by the appended claims and their equivalents.

What is claimed is:

1. A computer-implemented method for a transaction parallelization improvement metric calculation, comprising:

receiving, by a computing device, tracking data, the tracking data comprising information about inbound and outbound subtransactions between a plurality of domains over a time frame, each of the domains of the plurality of domains including at least one computer;

determining, by the computing device, a number of interactions using the tracking data, based on a number of the inbound and outbound subtransactions;

determining, by the computing device, a number of the plurality of domains, using the tracking data;

calculating, by the computing device, a transaction parallelization metric, using the tracking data;

calculating, by the computing device, a transaction parallelization improvement metric based on the number of interactions, the number of the plurality of domains, and the transaction parallelization metric, wherein a larger number of domains yields a lower calculated result for the transaction parallelization improvement metric; and displaying, by the computing device, the transaction parallelization improvement metric in a specific color depending on how the transaction parallelization improvement metric compares to a pre-defined threshold range.

2. The method of claim 1, wherein the inbound and outbound subtransactions are from a client to a server.

3. The method of claim 1, further comprising:

receiving a graphical constant from a user, the graphical constant being an arbitrary constant which controls a scale of a graphical representation of the transaction parallelization improvement metric; and displaying the graphical representation of the transaction parallelization improvement metric to a user based on the graphical constant.

4. The method of claim 1, further comprising:

storing one or more values of the transaction parallelization improvement metric over a time frame in a data bank;

calculating a historical baseline, based on the one or more values of the transaction parallelization improvement metric;

alerting a user when the transaction parallelization improvement metric is different than the historical baseline.

5. The method of claim 1, further comprising:

receiving a threshold from a user; and alerting the user when the transaction parallelization improvement metric satisfies the threshold.

6. The method of claim 1, further comprising:

calculating the transaction parallelization improvement metric for a plurality tracking data; and ranking the plurality of tracking data based on the transaction parallelization improvement metric.

7. The method of claim 1, wherein the transaction parallelization improvement metric is calculated using the following formula:

$$C=d+(1-d)((i-v)/i)(1-\exp(-i/k))$$

wherein:

d corresponds to parallelization metric;

i corresponds to number of interactions;

v corresponds to number of domains; and k corresponds to an arbitrary constant.

8. A computer program product for transaction parallelization improvement metric calculation, the computer program product comprising:

one or more non-transitory computer-readable storage media and program instructions stored on the one or more non-transitory computer-readable storage media, the program instructions comprising:

program instructions to receive, by a computer, tracking data, the tracking data comprising information about inbound and outbound subtransactions between a plurality of domains over a time frame, each of the domains of the plurality of domains including at least one computer;

program instructions to determine a number of interactions using the tracking data, based on a number of the inbound and outbound subtransactions;

program instructions to determine a number of the plurality of domains using the tracking data;

program instructions to calculate a transaction parallelization metric using the tracking data;

program instructions to calculate a transaction parallelization improvement metric based on the number of interactions, the number of the plurality of domains, and the transaction parallelization metric, wherein a larger number of domains yields a lower calculated result for the transaction parallelization improvement metric; and program instructions to display the transaction parallelization improvement metric in a specific color depending on how the transaction parallelization improvement metric compares to a pre-defined threshold range.

9. The computer program product of claim 8, wherein the inbound and outbound subtransactions are from a client to a server.

10. The computer program product of claim 8, further comprising:

program instructions to receive a graphical constant from a user, the graphical constant being an arbitrary constant which controls the scale of a graphical representation of the transaction parallelization improvement metric; and program instructions to display the graphical representation of the transaction parallelization improvement metric to a user based on the graphical constant.

11. The computer program product of claim 8, further comprising:

program instructions to store one or more values of the transaction parallelization improvement metric over a time frame in a data bank;

program instructions to calculating a historical baseline, based on the one or more values of the transaction parallelization improvement metric;

program instructions to alert a user when the transaction parallelization improvement metric is different than the historical baseline.

12. The computer program product of claim 8, further comprising:

program instructions to receive a threshold from a user; and program instructions to alert the user when the transaction parallelization improvement metric satisfies the threshold.

13. The computer program product of claim 8, further comprising:

program instructions to calculate the transaction parallelization improvement metric for a plurality tracking data; and program instructions to rank the plurality of tracking data based on the transaction parallelization improvement metric.

14. The computer program product of claim 8, wherein the transaction parallelization improvement metric is calculated using the following formula:

$$C=d+(1-d)((i-v)/i)(1-\exp(-i/k))$$

wherein:

d corresponds to parallelization metric;

i corresponds to number of interactions;

v corresponds to number of domains; and k corresponds to an arbitrary constant.

15. A computer system for transaction parallelization improvement metric calculation, the computer system comprising:

one or more computer processors;

one or more non-transitory computer-readable storage media; program instructions stored on the non-transitory computer-readable storage media for execution by at least one of the one or more processors, the program instructions comprising:

instructions to receive, by a computer, tracking data, the tracking data comprising information about inbound and outbound subtransactions between a plurality of domains over a time frame, each of the domains of the plurality of domains including at least one computer;

instructions to determine a number of interactions using the tracking data, based on a number of the inbound and outbound subtransactions;

instructions to determine a number of the plurality of domains using the tracking data;

instructions to calculate a transaction parallelization metric using the tracking data;

instructions to calculate a transaction parallelization improvement metric based on the number of interactions, the number of the plurality of domains, and the transaction parallelization metric, wherein a larger number of domains yields a lower calculated result for the transaction parallelization improvement metric; and instructions to display the transaction parallelization improvement metric in a specific color depending on how the transaction parallelization improvement metric compares to a pre-defined threshold range.

16. The computer system of claim 15, wherein the inbound and outbound subtransactions are from a client to a server.

17. The computer system of claim 15, further comprising:

instructions to receive a graphical constant from a user, the graphical constant being an arbitrary constant which controls the scale of a graphical representation of the transaction parallelization improvement metric; and instructions to display the graphical representation of the transaction parallelization improvement metric to a user based on the graphical constant.

18. The computer system of claim 15, further comprising:

instructions to store one or more values of the transaction parallelization improvement metric over a time frame in a data bank;

instructions to calculating a historical baseline, based on the one or more values of the transaction parallelization improvement metric;

instructions to alert a user when the transaction parallelization improvement metric is different than the historical baseline.

19. The computer system of claim 15, further comprising:

instructions to receive a threshold from a user; and instructions to alert the user when the transaction parallelization improvement metric satisfies the threshold.

20. The computer system of claim 15, wherein the transaction parallelization improvement metric is calculated using the following formula:

$$C=d+(1-d)((i-v)/i)(1-\exp(-i/k))$$

wherein:

d corresponds to parallelization metric;

i corresponds to number of interactions;

v corresponds to number of domains; and k corresponds to an arbitrary constant.

* * * * *